United States Patent [19]

Yates

[11] Patent Number: 4,832,706

[45] Date of Patent: May 23, 1989

[54] ABRASIVE MEDIA

[75] Inventor: Raymond W. Yates, West Midlands, United Kingdom

[73] Assignees: Foseco International Limited; Unicorn Industries Public Limited Company, both of Birmingham, England

[21] Appl. No.: 187,534

[22] PCT Filed: Sep. 15, 1987

[86] PCT No.: PCT/GB87/00641
§ 371 Date: May 5, 1988
§ 102(e) Date: May 5, 1988

[87] PCT Pub. No.: WO88/02299
PCT Pub. Date: Apr. 7, 1988

[30] Foreign Application Priority Data

Sep. 24, 1986 [GB] United Kingdom ............... 8622982

[51] Int. Cl.⁴ .............................................. B24D 3/00
[52] U.S. Cl. ...................................... 51/293; 51/295; 51/298; 51/320

[58] Field of Search .................. 51/293, 295, 298, 320

[56] References Cited

U.S. PATENT DOCUMENTS

| | | | |
|---|---|---|---|
| 3,410,124 | 11/1968 | Sowa | 72/53 |
| 4,545,155 | 10/1985 | Nakata | 51/320 |
| 4,548,617 | 10/1985 | Miyatani et al. | 51/293 |
| 4,575,396 | 3/1986 | Matsumoto et al. | 51/298 |
| 4,666,465 | 5/1987 | Matsumoto et al. | 51/298 |
| 4,731,125 | 3/1988 | Carr | 51/298 |

FOREIGN PATENT DOCUMENTS 561260 10/1957 Belgium .
1571239 7/1980 United Kingdom .

Primary Examiner—Paul Lieberman
Assistant Examiner—Willie J. Thompson
Attorney, Agent, or Firm—Nixon & Vanderhye

[57] ABSTRACT

Particles of urea formaldehyde furan resin are used as abrasive media in wet or dry blasting.

15 Claims, No Drawings

ABRASIVE MEDIA

The invention relates to abrasive media for use in removing paint, mould flash or the like from articles. The media comprises abrasive particles which may be contacted with the article to be treated as a suspension in a liquid carrier using a water slurry by a process known as wet blasting or in a high pressure stream of gas e.g. air by a process known as dry blasting.

U.S. Pat. No. 3,410,124, published in 1968, discloses a shot blasting process in which articles are blasted with an aqueous slurry containing particles of synthetic resin which particles are round edged, elastic, non softening and hard. The particles may be made from a variety of synthetic resins including urea formaldehyde.

U.S. Pat. Nos. 4,545,155 and 4,548,617, both published in 1985, disclose the use of particles of synthetic resin to remove mould flash. The particles are applied in a slurry of water containing a surfactant. The particles may be made from a variety of synthetic resins, including thermoset resins.

GB Pat. No. -A-1571239, published in 1980, discloses the use of particles of silica sand and slag for removing rust from articles by dry blasting, which particles are first coated with a thermoset resin so that the particles will have increased strength and less dust will be generated. The coating may be provided by a variety of thermoset resins, and urea furfuryl alcohol formaldehyde resin is mentioned.

In dry blasting it is also known to use crushed coconut shells or polystyrene granules as abrasive media. These materials are insufficiently hard for effective abrasion and/or are of low impact strength. It is also known to use crushed amino plastics moulding waste (in which filler is present) as abrasive media but this material lacks resistance to breakdown. It is further known to consolidate an amino plastics moulding powder incorporating a filler such as wood flour or cellulose fibre into shapes which are subsequently comminuted to yield media particles of suitable sizes. This method is expensive.

The invention is based on the realisation that particles of cured urea formaldehyde furan resin can be used with advantage as abrasive media, in wet or dry blasting or similar processes for abrasive treatment.

In one aspect, the invention provides a method of treating the surface of an article comprising contacting the surface to be treated with abrasive particles characterised in that the abrasive particles are of set urea formaldehyde furan resin.

The particles are hard, angular and sharp-edged; they have a degree of toughness and resilience which makes them resistant to breakdown in use e.g. total disintegration on impact. The particles can be free-flowing for handling in dry blasting.

According to another aspect of the invention there is provided a method of forming abrasive particles of the invention, comprising curing a liquid urea formaldehyde furan resin to translucent and homogeneous form, and comminuting the resin to yield particles of predetermined shape.

In a preferred feature, a liquid urea formaldehyde furan resin is made and poured into a mould and then set using an acid catalyst selected so that the liquid first gels to a rubbery condition; the rubbery moulding is removed and cut into shapes which are allowed to dry and cure such that extensive cracking occurs to provide on breakage highly angular chips which are then comminuted to the desired particle size.

The resin may have a urea:formaldehyde ratio of from 1:1.3 to 1:2.5, preferably 1:1.6 to 1:1.9 and may be prepared by a one-, or preferably two-, stage process. In the two-stage process urea and formaldehyde are preferably initially polymerised at a ratio of about 1:2.2 under acidic conditions, the mixture then neutralised, urea added to bring the ratio to 1:1.6 to 1:1.9 and polymerisation then continued to give a resin of solids content in the range of about 55 to about 75% with a corresponding viscosity of about 2 to about 20 c.Poise at 25° C. More preferably the solids content is from 60 to 65% and the viscosity from 3 to 10 c.Poise.

The urea and formaldehyde can be provided by a ureaformaldehyde concentrate or separately using, for example, aqueous formalin or a formaldehyde concentrate such as paraform to provide the formaldehyde.

The urea-formaldehyde resin is blended with furfuryl alcohol to yield a resin containing about 3 to about 30% of furfuryl alcohol, preferably about 5 to about 15%. Alternatively, the furfuryl alcohol may be incorporated during the synthesis of the resin.

An acid catalyst is preferably used to set the liquid UF furan resin and selected to permit casting the mixture into a mould to form a shape (such as a slab) and then quickly set the resin. The catalyst may be an inorganic or organic acid or an acidic salt e.g. of ammonia. Phosphoric acid is preferred because it permits easy control of gelation and is of low corrosiveness so that it minimises any adverse effect on metal substrates arising from residual salts in the abrasive media. The amount of phosphoric acid may be 1 to 10%, preferably 2 to 5%, (as a 10% w/w aqueous solution) based on the resin. The shape can be set in the mould at ambient temperature or at about 70° C.

The comminution process is preferably carried out in stages. For example, a shape of the set resin may be broken up initially into lumps using e.g. a jaw crusher and the lumps then comminuted using a hammer mill. Preferably the comminution is conducted to yield particles of sizes in the range of about 60 to about 170 mesh ASTM sieve grading and to minimise the production of fines e.g. smaller than 60 mesh. For different end uses the initial comminuted matter may be classified into ranges such as about 20 to about 30 mesh, about 30 to about 40 mesh, about 40 to about 60 mesh and about 60 to 120 mesh and about 70 to 170 mesh. Larger pieces such as about 3 mm to about 8 mm in diameter may be used.

It is preferred that the set resin by subjected to thermal curing. The comminuted particles may be dried and cured at about 95° C. for e.g. a few hours. Alternatively, a cast shape such as a slab of the resin, set but still in a rubbery state, can be cut into smaller shapes and these dried and cured in an oven at about 110° C. and then comminuted to give the desired particles. For example, a large slab may be cast and cut into smaller slabs for storage in an open arrangement for setting to continue and drying to begin at room temperature. Within say 24 hours, deep cracks develop in the slabs, but the slabs can still be handled without breakage. The slabs are then transferred to an oven when extensive cracking occurs resulting in the formation of highly angular 'chips' e.g. of a size of about 0.5 to 1 cm. Crushing of the 'chips' enables particles of sharp angularity to be made.

It is important that the resin is cured to translucent and homogeneous condition otherwise the particles will have inadequate impact strength for use as abrasive media.

It has been observed that in dry blasting there is a tendency for an electrostatic charge to build up. In a preferred feature of the invention this tendency is resisted by the use of particles of urea formaldehyde furan resin modified by the incorporation therein before curing of an anionic amino formaldehyde resin. Such resin may be MELMENT or PROTESINE (registered trade marks) in an amount of from about 0.5 to about 10% by weight of the UF resin, preferably about 1 to about 4% by weight. The invention extends to the UF furan resin modified as described and to particles thereof.

The abrasive media of the invention may be used in the form of particles for dry or wet blasting or the particles may be located on a carrier such as paper or plastics to form an abrasive paper, cloths, pads or the like.

The following Examples illustrate the invention. In the Examples, 'parts' and percentages are by weight and mesh numbers are ASTM mesh numbers.

EXAMPLE 1

711.0 parts of a commercial urea formaldehyde concentrate (urea 18%, formaldehyde 45% and water 37%) were charged to a reactor equipped with a stirrer and heating facilities. 161.9 parts of urea were added and heating applied. When the urea had dissolved 0.4 parts of 40% formic acid were added and heating continued to 90°–95° C. Polymerisation was allowed to proceed until the batch reached a viscosity of 630 c.Poise at 25° C. when 0.7 parts of 40% sodium hydroxide was added and the resin quickly cooled to 65° C. 124.8 parts of urea were added and the batch maintained at 50°–55° C. for 2 hours. After cooling to 30° C., 50.0 parts of furfuryl alcohol were thoroughly blended in.

The resin formed had a solids content of 64% viscosity of 280 c.Poise at 25° C. and a pH (Glan Electrode at 25° C.) of 7.8.

To 200 kgms of the above resin were added 7.2 liters of 10/5 w/w aqueous phosphoric acid and the mixture well agitated for 5 minutes. The catalysed resin was then poured into a mould measuring 2 meters×3 meters×8 cms. After 10 hours at an ambient temperature of 18° C. the slab was sufficiently hard to be broken into small pieces. The crudely broken slab was fed to a hammer mill and crushed to a particle size of 20 mesh maximum. The crushed material was dried/cured in a rotary drier for 4 hours at an air temperature of 95° C. The cured media particles so produced were classified into particle size grades of 20–30 and 30–40 mesh using a vibratory deck screen. The particles were translucent and yellow coloured with highly angular sharp edged features and a hardness of 4–5 Moh. In pain stripping by dry blast technique the particles gave excellent performance with good resistance to breakdown.

EXAMPLE 2

A UF resin was prepared as in Example 1 except that 90 parts of urea were added after cooling to 65° C. following neutralisation. The resin was maintained at 50°–55° C. for 2 hours and after cooling to 30° C., 80 parts of furfuryl alcohol was added and thoroughly blended. This yielded a UF furan resin of solids content 63.5% and viscosity of 350 c.Poise at 25° C.

200 kgms of the resin were mixed for 5 minutes with 6.5 liters of 10% w/w aqueous phosphoric acid. The blend was then cast into moulds measuring 1 meter×1 meter×5 cms. Gelation occurred in ca. 1 hour at ambient temperature. While still in a rubbery state the slabs were cut into strips of 1 meter×20 cms and these strips were dried and cured in an oven for 12 hours at 110° C.

The cured strips were broken and fed to a hammer mill to produce particles of a size of 20 mesh maximum. The particles were graded. The particles graded at 30–40 mesh was translucent in appearance and highly angular and sharp edged. They gave excellent paint removal in dry blasting application with a marked resistance to breakdown.

EXAMPLE 3

The material of Example 2 was used in wet blast application to remove flash from plastic injection moulded articles and gave excellent results.

I claim:

1. A method of treating the surface of an article comprising contacting the surface to be treated with abrasive particles characterized in that the abrasive particles are of cured urea formaldehyde furan resin.

2. A method according to claim 1 characterised in that the particles are contacted with the surface to be treated by dry blasting.

3. A method according to claim 1 characterised in that the particles are mixed with a liquid medium and then wet blasted on to the surface to be treated.

4. A method according to claim 1 characterised in that the particles are formed of a urea formaldehyde furan resin which has been cured to be translucent and homogeneous so that the particles are hard and resistant to breakdown on impact.

5. A method according to claim 1 characterised in that the particles are formed of a cured urea formaldehyde furan resin which has been modified by the incorporation therein of an anionic amino formaldehyde resin in a proportion sufficient for the particles to resist the build up of an electrostatic charge while being contacted with the surface.

6. A method according to claim 1 characterised in that the particles are supported on a carrier.

7. A method of forming abrasive particles of cured urea formaldehyde furan resin characterised by curing a liquid urea formaldehyde furan resin to translucent and homogeneous form, and comminuting the resin to form abrasive particles.

8. A method according to claim 7 characterised in that urea formaldehyde is mixed with furfuryl alcohol to provide a resin containing about 3 to about 30% of furfuryl alcohol, preferably about 5 to about 15%.

9. A method according to claim 7 characterised in that the liquid resin is set by an acid catalyst comprising an inorganic or organic acid or an acidic salt.

10. A method according to claim 9 characterised in that the acid catalyst is phosphoric acid in a proportion of 1 to 10%, preferably 2 to 5%, (as a 10% w/w aqueous solution) based on the resin.

11. A method according to claim 7 characterised in that a shape of urea formaldehyde furan resin is set and comminuted and then subjected to thermal curing and the particles are classified.

12. A method according to claim 7 characterised in that a liquid urea formaldehyde furan resin is poured into a mould and then set using an acidic catalyst selected so that the liquid first gels to a rubbery condition; the rubbery moulding is removed and cut into shapes which are allowed to dry and cure such that extensive cracking occurs, the cracked moulding is broken to provide highly angular chips and the chips are comminuted to the desired particle size.

13. A method according to claim 7 characterised in that an anionic amino formaldehyde resin is incorporated in the urea formaldehyde furan resin in an amount of from about 0.5 to about 10% by weight of the UF resin, preferably about 1 to about 4% by weight.

14. For use as abrasive media, a urea formaldehyde resin characterised in that the media comprises particles of urea formaldehyde furan resin.

15. For use as abrasive media, a urea formaldehyde resin characterised in that the media comprises particles of urea formaldehyde furan resin incorporating an anionic amino formaldehyde resin.

* * * * *